April 29, 1958
H. E. LA BOUR
2,832,371
FLOW CONTROL VALVE
Filed Aug. 26, 1953
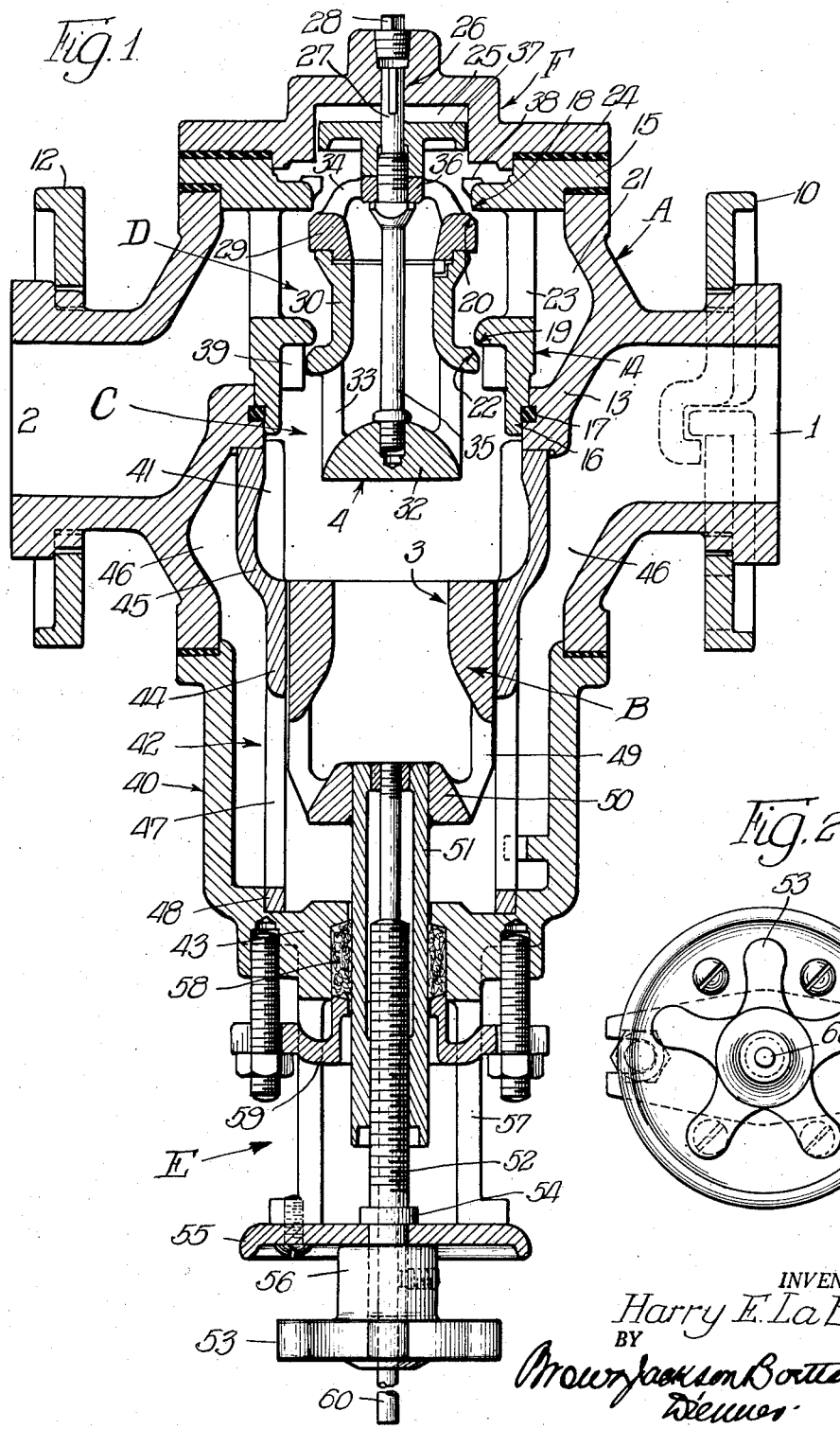
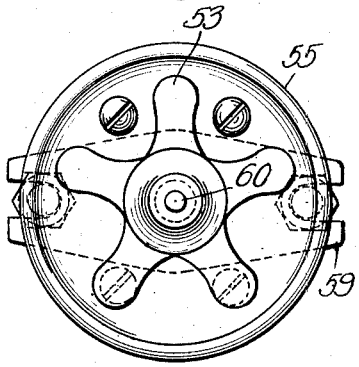
INVENTOR.
Harry E. La Bour,
BY

2,832,371
FLOW CONTROL VALVE

Harry E. La Bour, Elkhart, Ind.

Application August 26, 1953, Serial No. 376,659

4 Claims. (Cl. 137—504)

The present invention provides a flow control valve, the function of which is to insure a uniform rate of delivery of fluid therethrough so long as the head of fluid supply is maintained above a predetermined minimum.

There are many situations where it is desirable to deliver a flow of fluid at a uniform rate of delivery where the supply head does not remain constant. Such uniform rate of delivery of liquids is a desideratum in many situations in the chemical and other industries.

In my study of the problem of providing a device for securing the desired regulating function, I conceived the following relations as the basis of the device of the present invention. I have observed that a flow of fluid in the form of a jet issuing from a fixed nozzle and impinging upon a target tends to drive the target along with the flow with a force which for all positions of the target increases as the over all velocity of flow increases, and which for all velocities of flow diminishes as the target recedes from the region of greatest velocity of flow in the jet, that is, from a point at or near the end of the nozzle.

Upon providing the target with an appropriate restoring force to oppose the impact force, the target may be caused to assume a definite position for each definite value of overall velocity of the jet. The correlation of position of the target to velocity of flow may be employed to position a flow obstruction, such as a suitable valve, in a manner to increase the flow obstruction as the target member responds to the overall increased velocity of flow in the jet stream. Thereby the obstruction to flow supplied by the valve may be appropriately increased to conform to the overall increase in velocity of the fluid flow to produce a uniform rate of delivery of fluid through the device. The function of obstructing flow, as by a valve, should itself be free of the development of any forces attributable to fluid flow or pressure. I conceived that this may most conveniently be done by employment of a duplex balanced valve.

It is the object of the present invention to provide a device based upon the principle of employing the reaction between the jet and the target as the control of a means to keep the flow from exceeding a predetermined rate of delivery for a specific setting of the device.

The embodiment of my invention herein disclosed comprises essentially a conduit for fluid flow in one part of which is located a constriction in the form of a nozzle for developing a jet or predetermined fast moving current in the flow of fluid through the device. At another point in the conduit, is disposed a valve body tending to be moved by gravity or other suitable force toward open or less flow-obstructing position. In line with the nozzle and adapted to be impinged by the jet or fast moving current of fluid flowing therethrough is a target member which is connected to the valve, and is subject to the restoring force acting on the valve. The target member tends to be driven away or displaced from the nozzle by the jet stream of fluid into a position where the force of the jet thereupon is less. This displacement of the target produces a corresponding displacement of the valve body in the direction of increasing obstruction to flow through the device. The restoring force, in the preferred embodiment, is gravity acting upon all or a part of the movable system of valve and target. The movable system in the preferred embodiment is a unitary valve and target disposed in endwise vertical alignment above and aligned with the nozzle. Other restoring means and other arrangements of the movable system are permissible.

The preferred form of valve is a double faced or duplex balanced valve. A valve which is substantially unaffected by impressed pressure, and is substantially free of the influence of flow thereagainst may be employed.

Since the impact of the jet upon the target is accompanied by an equal and opposite reaction upon the nozzle, the force exerted upon either of these elements may be utilized to displace the valve. The utilization of the target for that service is preferable as it is simpler and more advantageous.

Since the device relies upon the impact of the fluid jet upon the target, it will automatically respond to variations in density to deliver the fluid at a uniform value of mass or weight per unit of time. The device is desirably designed to limit the effect of variations of viscosity and such variations within limits do not interfere with satisfactory performance of the device.

Now in order to acquaint those skilled in the art with the manner of constructing and operating a device embodying my invention, I shall describe, in connection with the accompanying drawings, a specific embodiment of the same.

In the drawings:

Figure 1 is a vertical longitudinal section through an embodiment of the invention which is suitable for controlling flow of liquid; and Figure 2 is a bottom plan view of the same.

The device illustrated contains the following four essentials. First there is a conduit for fluid flow which in the present device takes the form of the housing A having inlet 1 at the right and the exit 2 at the left and providing the spaces and passages hereinafter specified. Second, there is the nozzle member B which is in series with the conduit. It is in effect a Venturi nozzle for gradually constricting the fluid stream to a reduced cross section in which streamline flow at increased velocity is developed. This is a device for developing the fluid flow as a jet which is a current of reduced cross section flowing at a suitably high velocity into a region permitting lateral expansion faster than the fluid stream or jet can expand in its normal operation. The nozzle discharges the jet into an enlargement termed the expansion chamber. The third element is a target C which has an impact face 4 axially aligned with the nozzle B to receive upon said impact face 4 the jet of fluid flow issuing from the bore 3 of the nozzle B. The fourth element is the valve D connected to the target member C. This valve is a balanced duplex valve designed to be insensitive to pressure difference across the valve, so that its position is determined in a downward direction upon it and its connected parts, and the force of impact of the fluid jet upon the face 4 of the target member C in the upward direction.

The fourth element is the valve D for presenting a controlled obstruction to flow of the fluid through the device. The valve D and the target C are connected together and disposed in axial alignment with the nozzle B.

The valve D and the target C and whatever guiding and/or damper parts are connected to them constitute the movable system. The weight of this movable system acting in a downward direction under the force of gravity tends at all times to move the movable system so that the valve D is open to the extent permitted and the target C has its closest permitted approach to the outlet of the nozzle B. The force of gravity operating upon the movable system is constant. That is to say, gravity provides a constant force tending to open the valve and move the target towards the nozzle. The jet flow of fluid through the nozzle and into the expansion chamber impinges upon the face 4 of the target C and tends to drive the movable system upwardly. The force which the jet exerts upon the target member C for a given rate of flow increases (within limits) with the proximity of the target member C to the delivery end of the nozzle B. In brief, there is an optimum point of approach of the target C to the end of the nozzle B where the force of impact of a given rate of flow of fluid is a maximum, and as the target C recedes from the nozzle B, the force which is exerted by the jet stream upon the target diminishes due primarily to the increased cross section of flow of the jet stream.

The reaction between the nozzle B and the target C is equal and opposite, but this force diminishes as the parts take positions farther from each other. The valve D, which in this instance is a balanced duplex valve, is uninfluenced by flow or pressure difference. It offers an obstruction to fluid flow therethrough in accordance with the approach of the movable valve members to the seats. Hence, for a given flow through the nozzle B of a given fluid, there will be a corresponding definite position of the target member C, which under the influence of the definite weight of the movable system will hold the valve body in certain definite position relative to its seat, which for a predetermined pressure difference across the inlet and outlet 1 and 2, respectively, will provide the exact amount of obstruction to fluid flow required to limit the rate of fluid flow to the determined value. Thus assume that there is an increase in the supply pressure at the inlet 1, so that the pressure difference across the device is increased. Thereupon the rate of flow through the nozzle B will be increased, and the velocity of the jet will be increased. This will drive the target C farther away from the nozzle against the constant opposing force of gravity on the movable system, thereby moving the valve D closer to its seat and affording greater obstruction to flow, and this in turn reduces the rate of flow through the device to bring the rate of flow down to the predetermined value. Either one of the two opposing influences may be varied to change the graduation or setting of the device for the desired rate of fluid delivery therethrough. It is obvious of course that the pressure or head of the supply must always be great enough to cause delivery of the predetermined amount. For a given vertical position or setting of the nozzle B a greater downward force upon the movable system will result in a higher rate of delivery. Thus, by increasing the weight of the moving system, the downward force can be increased and the delivery rate thereby raised. However, it is not convenient to increase the weight of the moving system, since the same is preferably disposed wholly within the conduit or housing A. The other way of adjusting the rate of delivery is to change the location of the nozzle B with respect to the target C. Thus, by moving the nozzle B downwardly to a position farther away from the target C, the effective force of impact of a given rate of flow of fluid is reduced in relation to the predetermined downward force of gravity of the movable system, with the result that the movable system will find its support at a position lower than before the nozzle B was adjusted. In other words, the position of equilibrium of the movable system is at a point where the valve D provides greater opening and hence less flow-obstructing effect. This dependence of the position of equilibrium of the movable system upon the position of the nozzle B permits me to add a simple form of adjustment of setting of the valve for different desired rates of delivery of fluid through the device. Such an adjustment E comprises broadly a means for shifting the position of the nozzle B with respect to the target member C.

Since the rate of flow of fluid through the device is determined by the target member C seeking an equilibrium position between the downwardly acting force of gravity and the upwardly acting thrust of the jet, there are conditions under which a motion damper F will be desired in order to damp out cycling or fluctuation of the movement of the movable system in seeking equilibrium.

Now the details of embodiment of the invention in the specific construction herein illustrated, while in many respects they are advantageous, do not go to the vitals of the present invention.

A flow control valve finds utility in chemical service, and therefore a design suitable to be embodied in corrosion resisting material is desirable. The specific design here shown is suitable for embodiment in a corrosion-resisting alloy.

The housing A is formed substantially like a known form of valve housing with the inlet connection 1 provided with a short neck for engagement by a clamping flange 10. The outlet 2 is similarly provided with a short neck and a clamping flange 12 whereby the housing A may be included in a pipe line in the usual manner of a manually controlled valve housing. The housing A is formed with an opening at top and bottom, and with a generally diagonal web between inlet and outlet, this web being formed with a vertical opening through the center portion thereof for receiving the lower end of a generally cylindrical valve seat member or cage 14. The cage 14 has a shouldered flange 15 which is piloted inside the cylindrical opening in the top of the housing A and has a horizontally extending portion extending out over the upper edges of the wall surrounding the upper housing opening. The shoulder thus pilots the upper end of the cage member 14 in the valve housing A, and the extension 16 at the lower end which fits in the stepped cylindrical opening in the web member 13 pilots the cage member 14 at its lower end.

An O-ring 17 of an acid-resisting rubber or suitable equivalent is seated in a cylindrical groove formed in the wall of the opening of the web member 13 and extending across the joint into a V-shaped groove formed in the registering portion of the extension 16, serves to form a fluid-tight seal between the web member and the cage member 14 at the lower end of the latter. The cage member 14 provides two annular seats 18 and 19 which are of substantially the same effective diameter and which cooperate with the conical valve faces 20 and 22 on the valve D. The cooperating valve surfaces above described are of conical form and are of substantially equal effective diameter for the upper closure and the lower closure of the valve D. The valve seat cage 14 has openings for permitting free passage of fluid to the outlet from the lower and from the upper valve opening of the valve D, and for permitting insertion and assembly of upper valves element 29. The valve housing A provides an annular space for the valve cage 14, so as to provide ample cross section for fluid flow. Such flow restriction as there is in the valve as a whole is intended to be significant only at the openings of the valve D.

The flanged end 15 of the valve seat cage 14 is engaged and covered over by a cap member 24 which contains a dashpot cylinder 25 and a central guiding bore 26 for guiding the projecting stem 27 of the valve D. The outer end of said bore 26 is closed by a pipe plug 28.

The valve D is made up of two parts separately constructed, and thereafter assembled to bring the member which carries the upper valve face 20 into the space between the two valve seats 18 and 19. The upper part 29 which carries the valve face 20 is piloted and keyed to the lower member 30 which is formed integral with the target member 32, being connected thereto by integral formed arms 33. The upper portion 29 of the valve D is provided with spider arms 34 extending upwardly to a central hub through which passes the upper end of the central bolt or stem 35. The lower end of the bolt or stem 35 is threaded into the back of the body 32 of the target C. The upper end extends loosely through the hub member 36 and is threaded to receive a suitable nut or fastening means which in the present instance is the threaded hub of the piston 37 which fits somewhat loosely in the dashpot cylinder 25. The upper end of the stem 27 of the stem 35 extends into the bore 26, and receives guidance therefrom. The surface of the upper end 27 is grooved to avoid trapping of liquid in the bore of the guide 26. The upward limit of motion of the movable system consisting of the valve D and the target C is determined by the engagement of the valve faces 22 and 20 with the seats 19 and 18. The downward limit of motion is determined by shoulders 38 formed on the upper portion of the seat cage 14 which shoulders operate to stop the downward motion of the piston member 37. The lower end of the lower valve portion 30 is guided in the guiding vanes 39. Hence, the axial position of the moving system is closely guided, and the extent of vertical motion is limited as above described.

The lower opening in the main housing A is closed by a cup-shaped housing extension 40, the rim of which is flanged and piloted into the opening in the lower end of the main housing A and bolted thereto. Its chief function is to provide a suitable passageway for fluid from the inlet 1 and the lower opening in the housing A to the inlet end of the upwardly directed nozzle B.

A barrel member 42 is disposed between the lower surface of the web 13 and the bottom wall 43 of the auxiliary housing 40. This member 42 has a cylindrical portion 44 within which the nozzle member B is confined and is adjustable. Above the cylindrical portion 44, which might be termed the nozzle guiding portion, there is an outwardly flared expansion chamber portion 45 which lies above the cylindrical guiding portion 44 and is designed to give ample room for expansion of the jet flow and for the passage of fluid deflected radially by impingement of the jet from the nozzle B against the impact face 4 of the target C. The stream of fluid may flow without substantial restriction on through to the opening between the valve seat and face 19, 22 for a part of the fluid flow, and upwardly through the hollow bore of the hollow valve D to the upper opening between the valve seat 18 and face 20 for the remainder of the flow. Both of these flows discharge into the annular channel 21 which communicates with the discharge opening 2. The lower end of the barrel member 42 consists of vertical bars 47 joined to a ring 48 which seats in an annular counterbore in the bottom wall 43 of the auxiliary housing 40. The upper end of barrel member 42 has internal vertical ribs 41 which tend to discourage circumferential motion of the fluid. The upper ends of these ribs pilot into the central opening in web 13.

The nozzle member B has a bore 3 which has maximum constriction substantially at the upper outlet surface, preferably in the shape of a Venturi nozzle for producing a jet flow which is streamline in character, so far as possible, whereby to exert the desired impact force upon the impact face 4 of the target member C. The lower flared entry end of the nozzle B is joined by spider arms 49 to a hub member 50 which in turn is supported upon a hollow stem 51 internally threaded to receive the rotatable threaded stem 52 by which the vertical position of the nozzle member B may be adjusted by turning the knob 53 secured on the lower end of the stem 52. The stem 52 has a collar 54 lying above the plate 55, and the knob or hand wheel 53 has a hub 56 which bears against the opposite side of the plate 55. The hub 56 is attached to the stem 52 as by a set screw or otherwise, so that the hub is connected to the stem for both axial thrust and rotary stress. The plate 55 is held in fixed position relative to the auxiliary housing 40 by the legs 57 which are connected between the upper side of the plate 55 and to the lower side of the wall 43 of the auxiliary housing. The cylindrical stem 51 which supports the hub 50 of the nozzle B extends through a gland comprising the packing 58 and having the adjustable gland follower 59. For convenience of indicating the adjustment or position of the nozzle, an indicating member in the form of a rod 60 attached at its upper end to the hub 50 of the nozzle member B extends down through the hollow threaded stem 52 and projects out through the center of the knob or hand wheel 53. It may be provided with suitable graduations indicating the position of the nozzle B with respect to some predetermined location of the same, or it may be graduated in terms of rate of flow.

The inlet opening 1 communicates with an annular space 46 around the outside of the shell member 42, and this in turn communicates through the lower part of the said shell member through the space between the ribs or vanes 47 and through the arms of the hub of the nozzle member B to the bore 3 of the said nozzle member when the fluid flows forward in the jet to impinge the face 4 of the target member C. While I have shown a flat impact face, that is merely the preferred form. I have tried concave and convex impact faces, but regard the flat configuration as superior because of the greater ease of finishing the same, and hence more uniform results. The entire fluid passageway throughout is intended to be of ample cross section so as to avoid any substantial obstruction or restriction to flow outside of those parts which are designed to secure it, namely, the nozzle, to produce streamline flow with a minimum of energy loss, and the valve openings designed to produce the desired restriction to flow in order to control the same.

The operation of the device is as follows: The liquid flow which it is desired to conduct through the device at a uniform rate must be under sufficient head that the desired rate of flow will not fail. Assume, therefore, that liquid supply at a suitable head, which need not be constant, but will not fall below a predetermined minimum, is connected to the inlet connection 1. The outlet 2 is connected to a delivery pipe, the length or disposition of which is immaterial, since the present device is flow responsive. Liquid entering the inlet 1 passes down through the annular passageway 46 surrounding the barrel 45 and enters the lower end of the nozzle B through the space between the bars 47 of the barrel member 42, and the spider arms 49 of the hub 50 which supports the nozzle B. The bore 3 of the nozzle B provides a suitably shaped passageway for increasing the velocity of flow without substantial loss of head. This is a well known property of a Venturi shaped nozzle. The nozzle is designed to direct the jet upwardly into the expansion space above the end of the nozzle. The stream of liquid issuing from the bore of the nozzle is in the form of a jet. The jet strikes the impact face 4 of the target member C with a force which, other things being constant, depends, within limits, upon the proximity of the face 4 to the end of the bore 3 of the nozzle B. The impact face 4 must be far enough from the end of the nozzle to let the desired amount and velocity of flow be developed. The force of impact acts against the force of gravity which tends to pull the valve D downwardly towards the open position. The valve D is a balanced valve, and hence, when the target member C is driven upwardly by impact of the fluid flow in the jet, the valve does not snap to its seat, but assumes a position corresponding to a position of balance between the two forces, namely, downward on the valve and upward on the target. Upon an increase of fluid head on the inlet 1, the flow tends to increase, and immediately, the impact of the jet upon the target will increase, and will move the valve farther towards closed position, and thereby cut down the flow to keep the rate uniform.

Variations in viscosity have little effect upon the accuracy of the regulation, but if the flow of highly viscous fluids is to be controlled, the passageways may be enlarged to minimize the effect of the same. The jet of liquid flow striking the impact face 4 spreads out laterally and curves around the back of the target member C, part of the liquid flowing through the lower valve opening and part flowing up through the hollow valve and out through the upper valve opening to the delivery or outlet connection 2.

Since the flow of liquid in a closed conduit must be the same at every cross section because of the incompressibility and inextensibility of liquids, it is possible, by reducing the cross section at any part of the conduit, to increase the velocity of flow at that point. The nozzle B and target C are intended to take advantage of those properties.

The specific design herein shown is such as is suitable for controlling the flow of liquid, and it is more specifically applicable to chemical service, that is, corrosive liquids, although the matter of whether the liquid is corrosive or not has no influence upon the essential elements and their mode of operation, but only upon the question of the ability of the parts to stand up under the corrosive influence. The invention in suitable embodiment may be applied to controlling the flow of gases and vapors. I do not intend to be limited to the details of the specific embodiment, except as they are recited in one or more of the following claims, and then only to the extent that they are so included.

I claim:

1. A valve for automatically regulating the flow of fluid therethrough to a predetermined value for variations of pressure in the supply, comprising a main valve housing having inlet and outlet openings and an inner housing having two walls between said openings through which walls there are two axially aligned valve openings surrounded by axially aligned valve seats facing in the same direction, two connected lift valves having valve faces cooperating with said valve seats simultaneously, said valve faces and cooperating valve seats having substantially the same effective diameter respectively whereby said valves are balanced for various pressure difference upon opposite sides of the same, said connected valves being adapted to be so disposed that their weight is utilized as a biasing means tending to open them, a target member in the housing connected to said valves and serving when impacted by fluid flow through the housing to move the valves towards their seats and a nozzle connected to the inlet opening and directed at the target member to project the liquid flowing through the device as a stream impacting the target member said target member being disposed in the line of fluid flow between the nozzle and said valve seats.

2. A valve for automatically regulating the flow of fluid therethrough to a predetermined value comprising a main housing having inlet and outlet openings, an inner housing comprising two walls between said inlet and outlet openings, said walls containing axial aligned valve openings surrounded by axially aligned valve seats, a pair of connected lift valves having axially aligned valve faces, said valve seats and valve faces being of substantially the same effective diameter and being exposed to opposing pressure differences whereby said connected valves are balanced against each other in all working positions, fluid controlled dash pot means connected ot said valves to damp the axial motion of said valves, a fluid directing tapered nozzle in said main housing between said inlet opening and said connected valves for creating a centrally disposed stream of the fluid flowing through the housing and a target member connected to said connected valves in axial alignment and disposed in front of said nozzle to be impacted by the stream of fluid passing through said nozzle, said valves, target and nozzle being adapted to be disposed in vertical axial alignment with the nozzle below the target member, and the valves below the valve seats whereby the impact of the stream of fluid issuing from the nozzle upon the target member tends to close the valves and gravity tends to open the valves.

3. The combination with claim 1 of fluid controlled damping means connected to said valves to damp the axial movement of the same.

4. The combination with claim 1 of movable stem means extending to the outside of said valve housing for adjusting the distance between the nozzle and the target in order to adjust the rate of flow through the device.

References Cited in the file of this patent

UNITED STATES PATENTS

| | | |
|---|---|---|
| 257,069 | Beznor | Apr. 25, 1882 |
| 992,888 | Leopold | May 23, 1911 |
| 1,343,024 | Bark | June 8, 1920 |
| 2,105,876 | Birch | Jan. 18, 1938 |
| 2,307,949 | Phillips | Jan. 12, 1943 |
| 2,441,220 | Dixon | May 11, 1948 |
| 2,526,346 | Goldinger | Oct. 17, 1950 |
| 2,587,815 | Branson | Mar. 4, 1952 |
| 2,637,339 | Pease | May 5, 1953 |
| 2,647,531 | Berck | Aug. 4, 1953 |
| 2,657,712 | Huston | Nov. 3, 1953 |